(12) United States Patent
Chao et al.

(10) Patent No.: US 12,358,764 B2
(45) Date of Patent: Jul. 15, 2025

(54) TETHER MANAGEMENT SYSTEM AND METHOD

(71) Applicant: AVETICS GLOBAL PTE. LTD., Singapore (SG)

(72) Inventors: Jang En Joshua Chao, Singapore (SG); Gurbind Singh s/o Harbir Singh, Singapore (SG); Peng Wee Marcus See, Singapore (SG)

(73) Assignee: AVETICS GLOBAL PTE. LTD., Singapore (SG)

( * ) Notice: Subject to any disclaimer, the term of this patent is extended or adjusted under 35 U.S.C. 154(b) by 317 days.

(21) Appl. No.: 17/787,523

(22) PCT Filed: Dec. 18, 2019

(86) PCT No.: PCT/SG2019/050623
§ 371 (c)(1),
(2) Date: Jun. 20, 2022

(87) PCT Pub. No.: WO2021/126071
PCT Pub. Date: Jun. 24, 2021

(65) Prior Publication Data
US 2022/0380186 A1   Dec. 1, 2022

(51) Int. Cl.
*B66D 1/50*   (2006.01)
*B64U 10/60*  (2023.01)
*B64U 50/34*  (2023.01)

(52) U.S. Cl.
CPC .............. *B66D 1/50* (2013.01); *B64U 10/60* (2023.01); *B64U 50/34* (2023.01); *B64U 2201/202* (2023.01)

(58) Field of Classification Search
CPC ........ B66D 1/50; B65H 59/36; B65H 59/384; B65H 59/40; B64C 39/022; B64C 39/024; B64U 2201/202; B64U 10/60
See application file for complete search history.

(56) References Cited

U.S. PATENT DOCUMENTS 2,042,481 A * 6/1936 Patterson ................. B66D 1/50
242/418.1
4,058,277 A * 11/1977 Kozakiewicz ........... B64F 3/00
244/17.17
(Continued)

FOREIGN PATENT DOCUMENTS

CN   102135651 B    7/2012
CN   105173105 A   12/2015
(Continued)

OTHER PUBLICATIONS

Extended European Search Report dated Aug. 7, 2023 for Application No. 19956182.0.
(Continued)

*Primary Examiner* — Anna M Momper
*Assistant Examiner* — Nathaniel L Adams
(74) *Attorney, Agent, or Firm* — JCIP; Joseph G. Chu

(57) ABSTRACT

A tether management system is disclosed. The tether management system includes a spool, a tension sensor, a controller and a moveable pulley. The spool is rotatable to reel in and reel out a tether. The tension sensor measures a tension of the tether. The controller receives a desired tension of the tether and controls the rotation of the spool to reel in and reel out the tether based on a difference between a measured tension from the tension sensor and the desired tension of the tether. The moveable pulley is disposed to engage tether between the spool and the tension sensor. The moveable pulley being able to be biased and moveable along a linear path to adjust a tension of the tether when the tension of the tether deviates from the desired tension. A method for managing tether is also disclosed.

11 Claims, 5 Drawing Sheets

(56) References Cited

U.S. PATENT DOCUMENTS

| | | | |
|---|---|---|---|
| 4,895,079 A * | 1/1990 | Beatty | B66D 1/7426 104/174 |
| 4,981,456 A * | 1/1991 | Sato | B64U 10/60 446/30 |
| 9,290,269 B2 | 3/2016 | Walker et al. | |
| 2005/0179020 A1* | 8/2005 | Taylor | B66D 3/18 254/270 |
| 2009/0178757 A1 | 7/2009 | Cocovi et al. | |
| 2010/0104372 A1* | 4/2010 | Lawson | B66D 1/741 405/168.4 |
| 2014/0263852 A1 | 9/2014 | Walker et al. | |
| 2017/0008626 A1* | 1/2017 | Walker | B64C 39/024 |
| 2017/0259941 A1* | 9/2017 | Briggs, IV | B66D 1/505 |
| 2018/0251216 A1* | 9/2018 | Whitaker | B64C 39/024 |

FOREIGN PATENT DOCUMENTS

| | | | |
|---|---|---|---|
| CN | 105776049 A | | 7/2016 |
| CN | 206266012 U | | 6/2017 |
| CN | 107757942 A | * | 3/2018 |
| CN | 109626143 A | | 4/2019 |
| CN | 208883219 U | * | 5/2019 |
| FR | 2701919 A1 | * | 9/1994 ......... B65H 75/4486 |
| FR | 2712563 A1 | | 5/1995 |
| JP | S5061567 U | | 6/1975 |
| JP | S54133453 A | | 10/1979 |
| JP | S6031266 U | | 3/1985 |
| JP | S60100394 U | | 7/1985 |
| JP | S61086392 A | | 5/1986 |
| JP | H07206385 A | | 8/1995 |
| JP | 2000044179 A | | 2/2000 |
| JP | 2002003178 A | | 1/2002 |
| JP | 2018148719 A | | 9/2018 |
| KR | 1020190038901 A | | 4/2019 |
| KR | 1020190128191 A | | 11/2019 |
| WO | 2018165192 A1 | | 3/2018 |
| WO | 2018088407 A1 | | 5/2018 |

OTHER PUBLICATIONS

First Office Action with Search Report dated May 25, 2023 for Chinese Application No. 201980103522.5.
Examination Search Report dated Nov. 28, 2023 for Canadian Application No. 3, 164,954.
Decision of Rejection dated Nov. 27, 2023 for Chinese Application No. 201980103522.5.
Notice of Reasons for Refusal dated Dec. 14, 2023 for Japanese Application No. 2022-537495.
Notice of Preliminary Rejection dated Jan. 8, 2024 for Korean Application No. 10-2022-7021557.
International Search Report and Written Opinion of International Searching Authority dated Feb. 13, 2020 for International Application No. PCT/SG2019/050623.
International Preliminary Report on Patentability dated Apr. 19, 2021 for International Application No. PCT/SG2019/050623.
Reexamination Decision dated Nov. 26, 2024 for Chinese Application No. 201980103522.5.
Reexamination Office Action Dated Sep. 24, 2024 for Chinese Application No. 201980103522.5.
Notice of Deficiencies dated Aug. 27, 2024 for Israel Patent Application No. 293741.
Notice of Decision to Grant Patent dated Mar. 5, 2024 for Japanese Application No. 2022-537495.

* cited by examiner

TETHER MANAGEMENT SYSTEM AND METHOD

TECHNICAL FIELD

This invention relates to a tether management system and method. More particularly, this invention relates to a tether management system and method for use with unmanned aerial vehicles.

BACKGROUND

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Unmanned aerial vehicles (UAV) can hover at a position in the air for applications such as aerial photography, videography, inspection, etc. To extend the time that these UAVs remain operational in the air, the UAVs are tethered so that power can be supplied thereto. A tethered UAV is coupled via a tether to a tether management system. As mentioned above, the tether carries power lines. The tether may also carry communications lines to allow communication between the UAV and the tether management system. The tether management system reels the tether in or out as needed. During operation, the UAV is required to be able to climb, descend, translate, and operate in varying wind conditions. Without mitigation, such movements of the UAV can cause the amount of slack on the tether to vary. For example, when the UAV is piloted away from the tether management system, it may result in a decrease in the amount of slack of the tether to have possibly a whiplash effect on the UAV. Conversely, when the UAV is piloted in the direction towards the tether management system, it may result in an increase in the amount of slack of the tether. As a further example, when the UAV is hovering in a fixed position, wind speed may increase, causing aerodynamic drag on the tether to increase. Increase in aerodynamic drag is likely to result in an increase of tension in the tether. Conversely, wind speed may decrease, causing aerodynamic drag on the tether to decrease. A decrease in aerodynamic drag may result in a decrease of tension in the tether. Such changes in tension in the tether tends to cause jerky movements of the UAV, which affects the quality of photography, videography, etc. To prevent such jerky movements, it is necessary to maintain a minimum load variation on the tether. In other words, it is necessary to maintain a reasonably constant tether tension in a variety of conditions.

To mitigate this problem, different solutions have been proposed. One such solution is disclosed in Chinese Patent CN102135651B, entitled "Optical fiber micro cable withdrawing and releasing winch." CN102135651B discloses a torsion spring biased rocker arm pivotably mounted at a first end. Attached to a second end is a pulley. The pulley therefore moves in an arcuate path in this winch. Optical fibre to which an underwater robot is connected is threaded through the pulley. The torsion spring biases the rocker arm to maintain a tension of the optical fibre to within a tension range so that the winch can take up excess slack in the optical fibre. The rocker arm takes up significant space. The length of the optical fibre that the rocker arm can take up is limited due to the small angle of rotation of the rocker arm. The design can reel in and reel out optical fibre to cater only to a small change in tension of the optical fibre.

Another solution is disclosed in U.S. Pat. No. 9,290,269, Walker et al., entitled "Spooler for Unmanned Aerial Vehicle System." Walker discloses a spooling apparatus including a feeder/tension sensor. The feeder/tension sensor includes a pivotably rotatable dancer that functions in a manner similar to the rocker arm of the Chinese patent, CN102135651B. Therefore, this dancer will also be space consuming. Again, this dancer merely functions to mitigate filament slack; it does not by itself control tension of the filament.

Yet another solution is disclosed in US Patent Application No. 2018/0251216A1, Whitaker, entitled "Constant tension Tether Management System for a Tethered Aircraft." Whitaker discloses a moveable pulley that is rotatably mounted within a ground station along a tether travel path between a fixed pulley and a UAV. The moveable pulley moves in translation along a linear track. The tether exits the ground station through an exit disposed in the ground station in a direction towards the UAV. In this way, because the moveable pulley freely moves in a vertical direction relative to the ground between a first position and a second position, the moveable pulley will move along the linear track as the tension of the tether changes. A constant-force tensioning spring, coupled to the moveable pulley, and anchored to ground station at another end, biases the moveable pulley towards the first position. A sensor is disposed within the ground station to monitor a position of the moveable pulley to detect its movement along the linear track. The constant force tensioning spring, like the earlier described designs, is also space consuming. Furthermore, the upwardly extending linear track requires a lot of space to implement.

There is therefore a need for a tether management system which addresses, at least in part, one or more of the forgoing problems.

SUMMARY

According to an aspect of the present disclosure, there is provided a tether management system. The tether management system includes a spool, a tension sensor, a controller and a moveable pulley. The spool is rotatable to reel in and reel out a tether. The tension sensor measures a tension of the tether. The controller receives a desired tension of the tether and controls the rotation of the spool to reel in and reel out the tether based on a difference between a measured tension from the tension sensor and the desired tension of the tether. The moveable pulley is disposed to engage tether between the spool and the tension sensor. The moveable pulley being able to be biased and moveable along a linear path to adjust a tension of the tether when the tension of the tether deviates from the desired tension.

In some embodiments, the tether management system further includes an elongated compression spring for biasing the moveable pulley along the linear path.

In some embodiments, the tether management system further includes a first rod over which the elongated compression spring is sleeved.

In some embodiments, the tether management system further includes a second rod at least substantially parallel to the first rod, and a pulley support for supporting the moveable pulley. The pulley support includes two bushings through which the first rod and the second rod penetrate to allow the pulley support to be slidable thereon.

In some embodiments, the tether management system further includes a first end block at a first end of the first rod and the second rod, and a second end block at a second end of the first rod and the second rod. The elongated compression spring has a free length that is substantially equal to a length of the first rod.

In some embodiments, the elongated compression spring, when biased, has a force of about twice the tension of the tether over a range of operating tension of the tether.

In some embodiments, the tether management system further includes a limit stop disposed adjacent an intermediate position between the first end block and the second end block to limit movement of the pulley support to be along the first rod and the second rod between the second end block and the limit stop.

In some embodiments, the thickness of the spool is in the range of 1-10 times the thickness of the tether.

In some embodiments, the tether management system further includes a housing having a base, a roof opposite the base and a sidewall between the base and the roof. The spool is disposed such that a radial plane thereof is at least substantially parallel to the base of the housing.

In some embodiments, the tether management system further includes a fixed pulley disposed to engage tether between the moveable pulley and the tension sensor, and a tension pulley for guiding the tether along an exit section of a path of the tether extending through the roof of the housing. The tension sensor is coupled to the tension pulley to measure a tension of the tether.

In some embodiments, the exit section is transverse to the linear path of the moveable pulley.

In some embodiments, the tether management system further includes a bracket to which the tension pulley and the tension sensor are mounted, and a fairlead mounted to the bracket through which the tether exits the housing. The fairlead includes at least one roller that is able to urge the tether against the tension pulley.

In some embodiments, the controller is adapted to determine a speed for rotating the spool based on a difference between the measured tension of the tether and the desired tension.

In some embodiments, the controller is adapted to further limit the speed for rotating the spool to a cap value corresponding to a length of tether left on the spool when less than a predetermined length of tether is left on the spool.

In some embodiments, the tether management system further includes a sensor for determining if an end of spool is near. The controller is adapted to set the speed to zero when the sensor indicates an end of the spool is near.

In some embodiments, the tether management system further includes a guard disposed adjacent the spool to prevent tether slippage.

According to another aspect of the present disclosure, there is provided a method for managing tether on a spool. The method includes receiving a desired tension for deployed tether and measuring a tension of the deployed tether. The method also includes rotating the spool to reel in and reel out the tether based on a difference between the measured tension and the desired tension. The method further includes engaging the tether with a moveable pulley and biasing the moveable pulley to be moveable along a linear path to adjust a tension of the tether when the tension of the tether deviates from the desired tension.

In some embodiments, the method further includes determining a speed for rotating the spool based on a difference between the measured tension and the desired tension, and wherein rotating the spool includes rotating the spool at the determined speed.

In some embodiments, the method further includes limiting the speed for rotating the spool to a cap value corresponding to a length of tether left on the spool when less than a predetermined length of tether is left on the spool.

In some embodiments, the method further includes setting the speed to zero when an end of spool is detected to be near.

In some embodiments, biasing the moveable pulley includes biasing the moveable pulley with an elongated compression spring having a force that is about twice the tension of the tether over a range of desired operating tension of the tether.

Other aspects and advantages of the invention will become apparent from the following detailed description, taken in conjunction with the accompanying drawings, illustrating by way of example the principles of the invention.

BRIEF DESCRIPTION OF DRAWINGS

The invention will be better understood with reference to the drawings, in which.

DETAILED DESCRIPTION OF THE EMBODIMENTS

Throughout this document, unless otherwise indicated to the contrary, the terms "comprising", "consisting of", "having" and the like, are to be construed as non-exhaustive, or in other words, as meaning "including, but not limited to."

Furthermore, throughout the specification, unless the context requires otherwise, the word "include" or variations such as "includes" or "including" will be understood to imply the inclusion of a stated integer or group of integers but not the exclusion of any other integer or group of integers.

Throughout the description, it is to be appreciated that the term 'controller' and its plural form include microcontrollers, microprocessors, programmable integrated circuit chips such as application specific integrated circuit chip (ASIC), computer servers, electronic devices, and/or combination thereof capable of processing one or more input electronic signals to produce one or more output electronic signals. The controller includes one or more input modules and one or more output modules for processing of electronic signals.

Unless defined otherwise, all technical and scientific terms used herein have the same meaning as is commonly understood by a skilled person to which the subject matter herein belongs.

Figure 1:
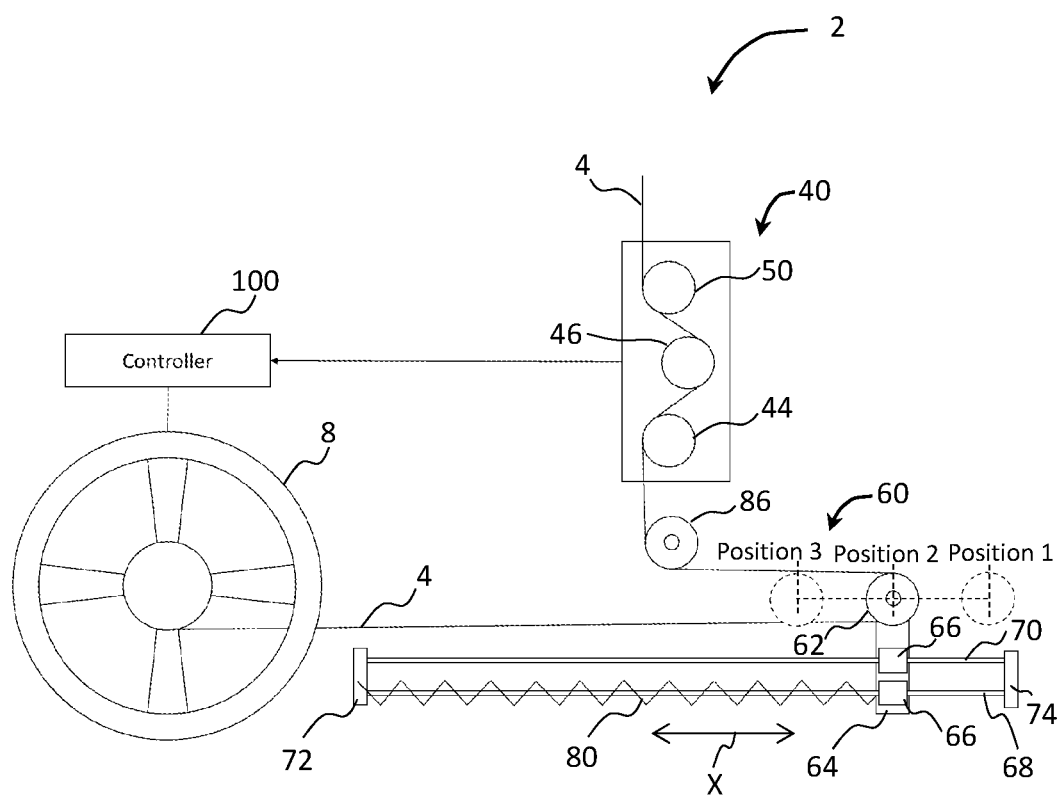
FIG. 1 is a schematic drawing of a tether management system according to an embodiment of the invention.
Figure 2:
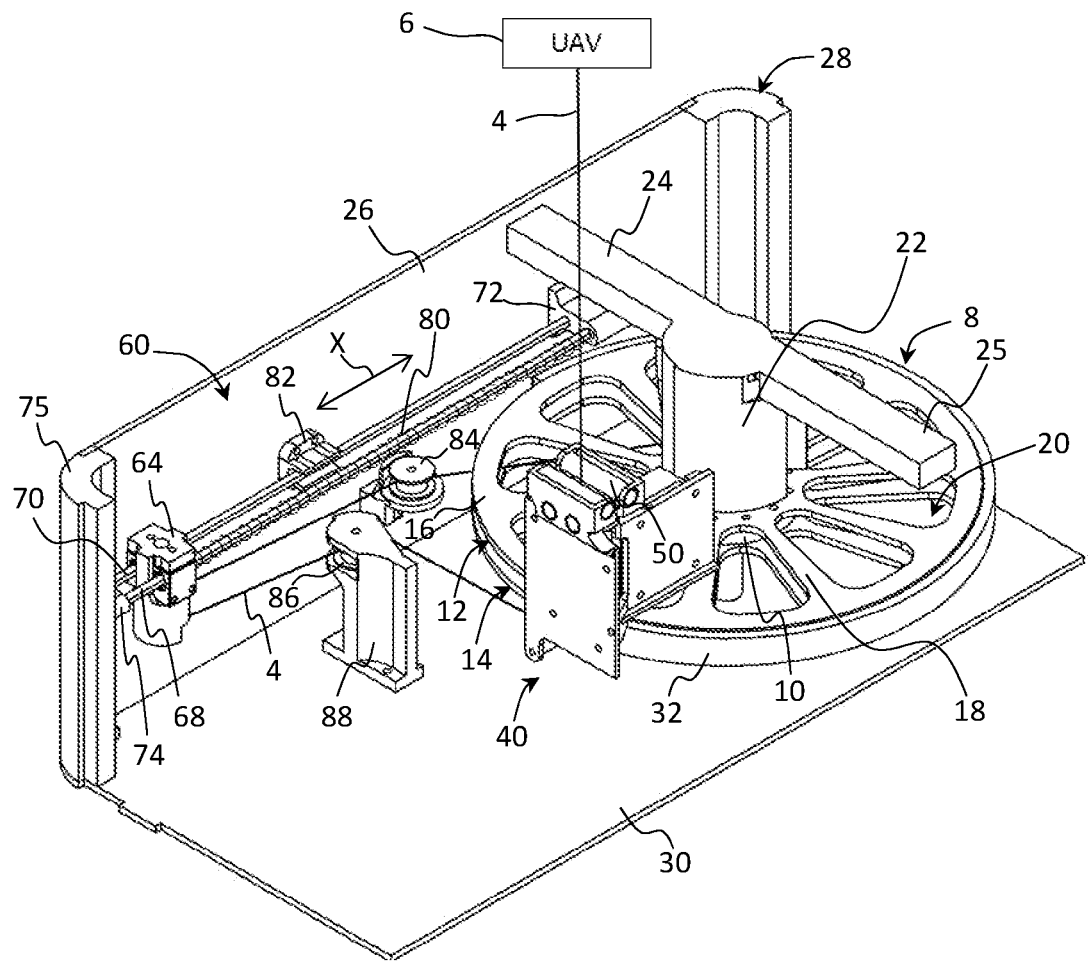
FIG. 2 is an isometric drawing of the tether management system in FIG. 1.
Figure 3:
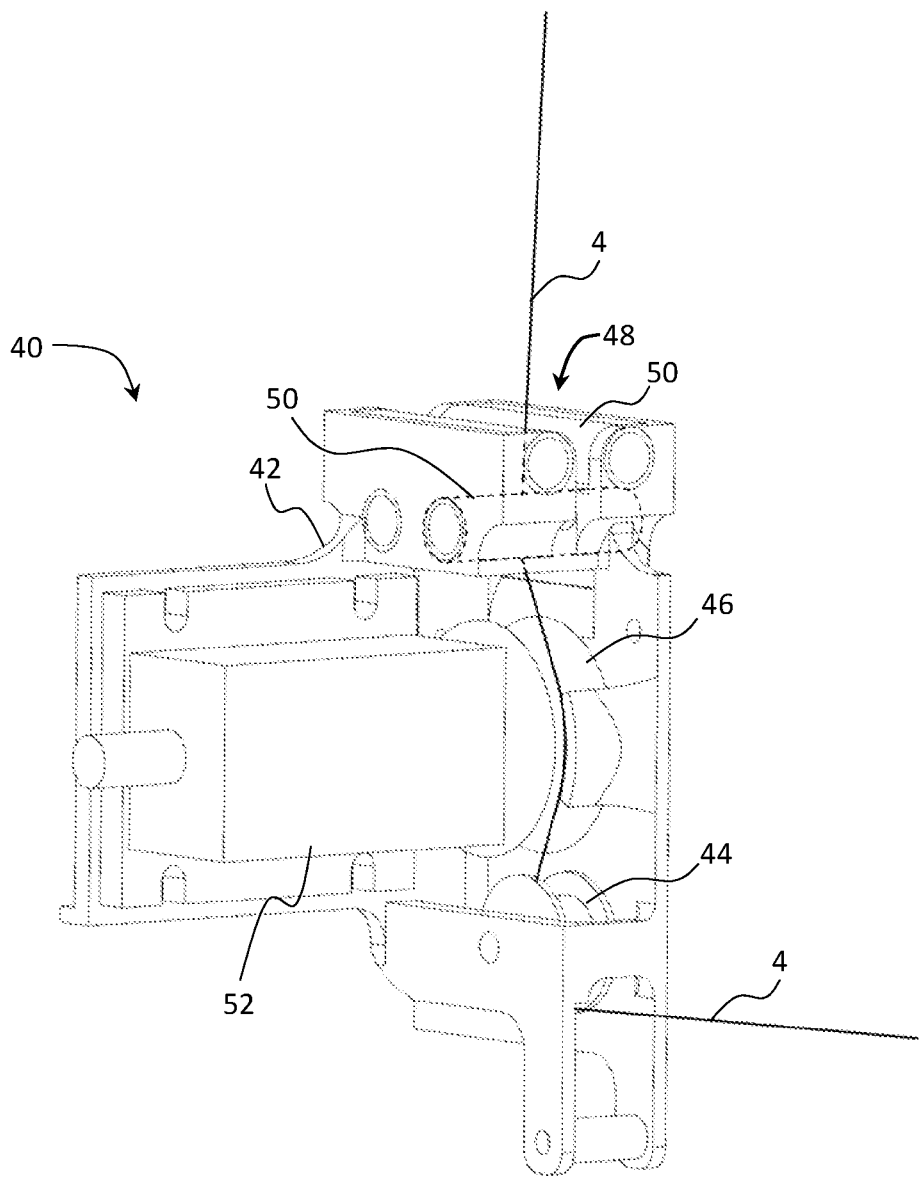
FIG. 3 is an enlarged isometric drawing of a tension assembly of the tether management system in FIGS. 1 and 2.

As shown in the drawings for purposes of illustration, the invention may be embodied in a novel and compact tether management system. Existing tether management systems tend to be bulky. Referring to FIGS. 1 to 3, a tether management system embodying the invention generally includes a spool, a tension sensor, a controller and a moveable pulley. The spool is rotatable to reel in and reel out a tether. The tension sensor is disposed along a path of the tether to measure the tension of the tether. The controller receives a desired tension of the tether from a user and controls the rotation of the spool to reel in and reel out tether based on a difference between the measured tension of the tether and the desired tension. The moveable pulley is disposed along the path of the tether between the spool and the tension sensor. The moveable pulley can be biased and moveable along a linear path to adjust a tension of the tether when the tension of the tether deviates from the desired tension.

Specifically, FIG. 1-3 show the above tether management system 2 for reeling in and out a tether 4 connected to an unmanned aerial vehicle (UAV) 6 (FIG. 2). The tether management system 2 includes a spool 8 having a cylindrical drum 10 flanked on both ends by respective flange members 12, 14 fixedly attached to the drum 10. The flange members 12, 14 retain the tether 4 on the spool 8. The flange members 12, 14 may be of a diameter that allows the spool 8 to hold a length of, for example, 70 m of tether 4. Each flange member 12, 14 has a rim 16 and spokes 18 radially extending from a central portion thereof to the rim 16. The rim 16 and the spokes 18 define openings 20 in the flange members 12, 14. During use, the tether 4 carries power lines supplying power to the UAV 6, amongst others. The tether 4 may thus generate a considerable amount of heat, especially after prolonged use, and the openings 20 in the flange members 12, 14 facilitate dissipation of this heat that is generated. One or more fans (not shown) may be further employed to blow air directly at the wound tether 4 to further aid in cooling it. Such a design of the spool 8 is simple and yet reliable. The thickness of the cylindrical drum 10 may be in the range of 1 to 10 times, preferably 5 times, the thickness of the tether 4 to be wound around the drum 10. This thickness of the drum 10 allows the tether 4 to be neatly spooled without the need for a level winding mechanism. It is found that this thickness of the drum 10 is optimized considering factors like the cooling ability, the diameter of the spool 8 required for holding a given length of tether 4 and the necessity to prevent tether entanglement.

A through beam type photoelectric sensor (not shown) is used to detect that only about 5 m of the 70 m of tether is left on the spool 8, i.e. the end of the spool 8 is near. This photoelectric sensor has a light emitting element that is disposed on one side of the spool 8 and a light receiving element that is disposed on the other side of the spool 8. When the length of the tether 4 wound on the spool is more than 5 m, light emitted by the light emitting element is blocked by the tether 4 and cannot reach the light receiving element. However, when the tether 4 is reeled out and only about 5 m of the tether is left on the spool, light from the light emitting element impinges on the light receiving element for it to indicate that condition. Those skilled in the art will also recognize that other types of sensors can also be used for detecting the end of the spool 8. These sensors include, but are not limited to, retroreflective photoelectric sensors, diffused photoelectric sensors and limit switches.

The spool 8 is connected to a shaft of a motor which is operated to turn the spool 8 in both clockwise and anti-clockwise directions. The motor is mounted in a cylindrical housing 22 with a proximal end thereof adjacent the spool 8. Connected to a distal end of the cylindrical housing 22 is a first cantilevered beam 24 and a second cantilevered beam 25 extending in opposite directions to each other to a first sidewall 26 and a second sidewall (not shown) of a housing 28. In this manner, the spool 8 is suspended horizontally with respect to a base 30 of the housing 28. In other words, the spool 8 is disposed such that a radial plane thereof is, more or less, parallel to the base 30 of the housing 28. Optionally, a guard 32 may be provided to cover a circumferential section of the spool 8 for preventing tether slippage. For example, the guard 32 may cover about 75% of the circumferential section of the spool 8 leaving a small section uncovered for the tether 4 to be reeled in and out of the spool 8. The guard 32 may be supported in place by the cylindrical housing 22 or mounted on the base 30 or a sidewall of the housing 28.

The tether management system 2 further includes a tension assembly 40 mounted to an inner wall (not shown) of the housing 28. This tension assembly 40, shown in FIG. 3, includes a bracket 42 that is mounted to the inner wall. The bracket 42 supports a first guide pulley 44, a tension pulley 46 and a fairlead 48. The fairlead 48 includes two pairs of rollers 50 transverse to each other. One of these rollers 50 urges the tether 4 against the tension pulley 46. Connected to the tension pulley 46 is a tension sensor 52 for measuring the tension of the tether 4. Force exerted by the tether 4 on the tension pulley 46 will be detected and measured by the tension sensor 52. A roof (not shown) of the housing 28 includes an opening through which the fairlead 48 is exposed.

The tether management system 2 also includes a compensator system 60 that engages the tether 4 between the spool 8 and the tension assembly 40. The compensator system 60 includes a moveable pulley 62 through which tether 4 that is reeled out of the spool 8 is threaded. The moveable pulley 62 can be biased and moveable along a linear path, in a direction indicated by double-headed arrow X, to adjust the tension of the tether 4 during use. The moveable pulley 62 is supported on a pulley block 64. This pulley block 64 includes two bushings 66 having ball bearings (not shown) therein. Two elongated guide rods 68, 70, at least substantially parallel to each other, are inserted through the two bushings 66 of the pulley block 64 to allow the pulley block 64 to slide along them. Two end blocks 72, 74 are connected to the ends of the two guide rods 68, 70. One end block 72 is disposed on the sidewall 26 of the housing 28 proximal to the spool 8. The other end block 74 is disposed on a pillar 75 of the housing 28, distal from the spool 8. Both guide rods 68, 70 are disposed at about the same height from the base 30 of the housing 28 to define the linear path on which the pulley block 64, and thus the moveable pulley 62, can slide along. Sleeved over an inner rod 68 of the two rods 68, 70 is an elongated helical compression spring 80 that has a free length close to or the same as the length of the inner rod 68. In an uncompressed state of this compression spring 80 when the length of the spring 80 is at its free length, the pulley block 64, and along with it the moveable pulley 62, is pushed towards the second end block 74 that is distal from the spool 8. This position of the moveable pulley 62 is shown as Position 1 in FIG. 1. The compression spring 80 may be of a unitary design or it may include two or more sections joined via any connectors or adapters, or simply sleeved over the rod abutting one another.

The compensator system 60 further includes a limit stop 82 sleeved over the outer rod 70 and mounted to the sidewall 26. The limit stop 82 is disposed adjacent an intermediate position between the first end block 72 and the second end block 74 to limit movement of the pulley support 64 to be along the first rod 68 and the second rod 70 between the second end block 74 and the limit stop 82. Typically, the helical compression spring 80 has a working length of about 25%-75% of its free length. For a selected range of tension of operation of the tether 4, the length of the spring is selected such that the spring force is 0 g at uncompressed state and about 400 g (maximum operating load) when it is compressed to be at the limit stop 82. Thus, the working length is about 40% of the maximum length of the compression spring 80.

The tether management system 2 further includes a second guide pulley 84 mounted to the sidewall 26 to be on a same horizontal plane as the moveable pulley 62. The tether management system 2 further includes a fixed pulley 86 mounted on a columnal structure 88 to be on the same horizontal plane as the second guide pulley 84 and the moveable pulley 62. The columnal structure 88 extends from the base 30 of the housing 28. The inner wall (not shown) described above is supported by this columnal structure 88.

During use, the tether 4 is threaded out of the spool 8, through the second guide pulley 84, the moveable pulley 62 and the fixed pulley 86 along a path on a horizontal plane. The tether 4 is further threaded through the first guide pulley 44 and the tension pulley 46 of the tension assembly 40 to have its path translated in a vertical plane. The tether 4 is further threaded through the fairlead 48 to extend out of the housing 28 for connection to the UAV 6. In other words, an exit section of the path of the tether 4 is transverse to the linear path of the moveable pulley 62.

The tether management system further includes a controller 100 that is connected to a touchscreen input and/or a mobile phone (both not shown) via a Bluetooth connection. Through a suitable interface on any of these devices, the controller 100 is able to receive, from a user, a desired tension for operating the tether 4 and to control the rotation of the spool 8 to reel in and reel out the tether 4 based on a difference between a measured tension provided by the tension sensor 52 and the desired tension. The controller 100 is further able to receive an end of spool signal from the photoelectric sensor.

Figure 4:
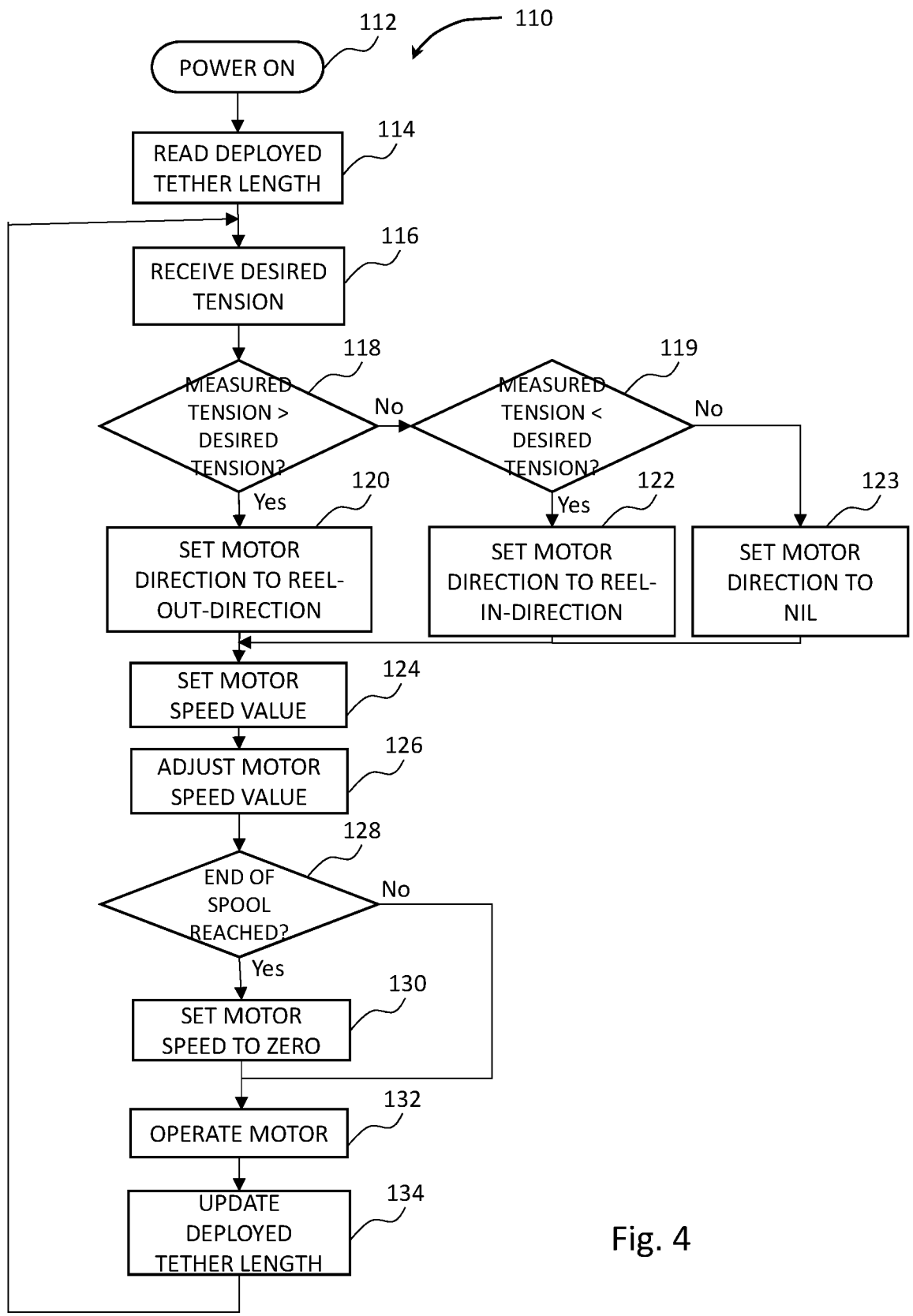
FIG. 4 is a flowchart showing a sequence of steps in the tether management system in FIGS. 1 and 2 for controlling a tension of a tether.

The method for controlling the rotation of the spool to adjust the tension of the tether 4 when the tension of the tether 4 deviates from the desired tension is next described. FIG. 4 is a flowchart showing the method 110. The method 110 starts in a POWER ON step 112 when power to the controller 100 is turned on. The method 110 next proceeds to a READ DEPLOYED TETHER LENGTH step 114, wherein the controller 100 reads data associated with a length of the tethered 4 deployed from a non-volatile memory (not shown), for example, an SD card. The method 110 next proceeds to a RECEIVE DESIRED TENSION step 116, wherein the controller 100 is able to receive from a user via either the touchscreen or mobile phone a desired tension value at which deployed tether 4 is to be maintained. The method 110 next proceeds to a MEASURED TENSION>DESIRED TENSION? decision step 118, wherein the controller 100 determines if the measured tension captured by the tension sensor 52 is greater than the desired tension set by the user. If the measured tension is greater than the desired tension as determined in this decision step 118, such as when the UAV is increasing in height or there is an increase in wind speed, the method 110 proceeds to a SET MOTOR DIRECTION TO REEL-OUT DIRECTION step 120, wherein a direction to operate the motor is set to a reel-out direction. If however it is determined in the decision step 118, that the measured tension is not greater but lower than or equal to the desired tension, the method 110 proceeds to a MEASURED TENSION<DESIRED TENSION? decision step 119, wherein the controller 100 determines if the measured tension is lower than the desired tension. If the measured tension is lower than the desired tension as determined in the decision step 119, such as when the UAV is decreasing in height or there is a decrease in wind speed, the method 110 proceeds to a SET MOTOR DIRECTION TO REEL-IN DIRECTION step 122, wherein the direction to operate the motor is set to a reel-in direction that is opposite to the reel-out direction. If however it is determined in the decision step 119, that the measured tension is not lower than the desired tension but equal to the desired tension, the method 110 proceeds to SET MOTOR DIRECTION TO NIL step 123, wherein the direction to operate the motor is set to zero to indicate that the motor need not be rotated. After the SET MOTOR DIRECTION steps 120, 122, 123, the method 110 proceeds to a SET MOTOR SPEED VALUE step 124, wherein the controller 110 determines a speed value for driving the motor using a PID control based on the difference between the measured tension and the desired tension. The determined speed value may range, for example, from 0-255.

The method 110 further proceeds to an ADJUST MOTOR SPEED VALUE step 126, wherein the controller 100 adjusts the speed value obtained in the SET MOTOR SPEED VALUE step 124 based on the length of tether 4 deployed. For example, as described above, the spool 8 may be able to hold 70 m of tether. When the length of the deployed tether 4 is less than or equal to 60 m, i.e. about 10 m or more of tether is left on the spool 8, no adjustment of the motor speed value is necessary. However, when the length of deployed tether goes beyond 60 m, the motor speed value is adjusted downwards to be capped at cap values decreasing with increasing length. For example, the cap value may be correspondingly lowered to 127 for a length of deployed tether 4 of 62.5 m, and correspondingly lowered to 0 for a length of deployed tether 4 of 65 m. As an example, the motor speed value may be determined to be 199 in the SET MOTOR SPEED VALUE step 124. But when it is determined that the length of the deployed tether is at 62.5 m in the ADJUST MOTOR SPEED VALUE step 126, the motor speed value is lowered from 199 to be capped at the cap value of 127 corresponding to the 62.5 m mark. As a further example, the motor speed value may be determined to be 76 in the SET MOTOR SPEED VALUE step 124. But when it is determined that the length of the deployed tether is 65 m in the ADJUST MOTOR SPEED VALUE step 126, the motor speed value is lowered from 76 to be capped at the cap value of 0 corresponding to the 65 m mark. The remaining 5 m of the tether 4 is used as a buffer.

The method 110 next proceeds to an END OF SPOOL REACHED? decision step 128, wherein the controller 100 determines if an end of spool condition, e.g. 65 m of the tether 4 has been deployed leaving only about 5 m of tether 4 left on the spool 8, is reached by reading the photoelectric sensor. If it is determined in this decision step 128 that the end of spool is reached, the method 110 proceeds to a SET MOTOR SPEED VALUE TO ZERO step 130, wherein the controller 100 sets the motor speed value to zero regardless of its value as determined in the steps 124, 126. If it is determined in this step 130 that the end of spool has not been reached, no change is made to the motor speed value determined earlier. This is a fail-safe design just in case the controller 100 determines the tether length deployed to be still less than 65 m when it has reached 65 m. The method 110 proceeds to an OPERATE MOTOR step 132, wherein the controller 100 operates the motor according with the set direction and motor speed to reel the tether 4 in or out to return the tension of the tether 4 closer to the desired tension set by the user. The method 110 further proceeds to an UPDATE DEPLOYED TETHER LENGTH step 134, wherein the controller 100 reads the number of revolutions made by the motor via a motor encoder (not shown), calculates the amount of tether 4 reeled in or out and updates the length of tether 4 deployed in the non-volatile memory. Each turn of the motor will correspond to a different tether length depending on how much tether is left on the spool 8. To obtain the length of tether deployed for any length of tether 4 left on the spool 8, a formula corresponding to a $3^{rd}$ order best fit curve between two known deployed lengths of 0 m and 60 m is used. Although such a formula is not very accurate, the length of tether obtained using the formula is acceptable as the user does not need to know the exact length of the tether. The length of tether deployed is also displayed on an LCD screen (not shown) or the user's mobile phone so that the user is aware of the amount of tether 4 available in the spool 8 to enable the user to operate the UAV 6 accordingly. For example, with the information on how much tether 4 is remaining in the spool 8, the user can choose to fly the UAV 6 higher, further or both. Without this information, the user will not be aware that tether 4 may be running out and their filming or photo taking using the UAV 6 might be affected by the sudden jam when the tether 4 runs out.

The method 110 loops around the steps 116-134 to provide a closed-loop control of the spool 8. With such a control loop, the controller 100 is able to reel in and reel out tether 4 such that the tension of the tether 4 is close to or at the desired tension. However, there is latency in such control. Any change in the tension in the tether 4, if not immediately corrected, may result in jerky movements of the UAV 6. The compensator system 60 can mitigate this problem at least to some extent. When the tension of the tether 4 is at the desired tension level, the controller 100 will keep the motor still. At this tension level, the compression spring 80 is compressed such that the force of the spring 80 is double the tension experienced by the tether 4. The position of the moveable pulley 62 is at Position 2 in FIG. 1.

When the tension of the tether 4 is greater than the desired tension level and before the controller 100 is able to reel out the tether 4 as described above, the moveable pulley 62 is forced to slide along the rods 68, 70 in a direction of the first end block 72 to move to Position 3 as shown in FIG. 1. In this position of the moveable pulley 62, the compression spring 80 is compressed, such that the force in the spring 80 is about twice the new increased tension in the tether 4. This movement of the moveable pulley 62 closer to the spool 8 reduces the length of the tether 4 between the spool 8 and the tension pulley 46. The excess tether 4 is drawn beyond the tension pulley 46 to increase the tether length between the tension pulley 46 and the UAV 6. In this manner, the tension in the tether 4 is reduced quickly before the controller 100 is able to respond. When the controller 100 finally operates the motor to reel out more tether 4, the tension in the tether 4 will decrease and the compression spring 80 will push the moveable pulley 62 back towards the steady state Position 2 as shown in FIG. 1.

When there is a sudden decrease in tension in the tether 4 due either to the UAV 6 decreasing in height or a decrease in the wind speed, the tension sensor 52 will sense the decrease in tension in the tether 4. As described above, the controller 100 will operate the motor to reel in the tether 4. However, due to latency in the method 110, there will be a delay in reeling in the tether 4. Before the motor is able to reel in the tether 4, the moveable pulley 62 in the compensator system 60 will move in a direction towards Position 1 as shown in FIG. 1 to decompress the compression spring 80, such that the force in the compression spring 80 is about twice the new decreased tension in the tether 4. This movement of the moveable pulley 62 draws more tether 4 in to increase the length of the tether 4 between the spool 8 and the tension pulley 46. The length of the tether 4 between the tension pulley 46 and the UAV 6 is reduced, thus reducing slack and increasing the tension in the tether 4. When the controller 100 finally operates the motor to reel in the tether 4, the tension in the tether will increase, and the moveable pulley 62 will once again be pushed by the tether 4 to move back to its steady state Position 2.

Advantageously, the tether management system 2 having a moveable pulley 62 moveable along a linear path as described above may be compactly built. The compensator system 60 of the tether management system 2 can maintain tension in the tether 4 within an acceptable range, compensating for the latency in the tension sensor 52 and motor feedback loop. The compensator system 60 can instantaneously reel out tether 4 when more tether 4 is required thus preventing the tether 4 from experiencing a sudden large tension force. The compensator system 60 can also instantaneously reel in the tether 4 when there is too much tether slack below the UAV 6, thereby lowering the risk of tether entanglement with objects near the UAV and preventing the tether 4 from experiencing a sudden loss of tension. While it reduces the amplitude of change in the tension in the tether 4, it does not completely remove the change in tension in the tether 4. It also retains the polarity of change. In other words, the compensator system 2 scales down the change in tension of the tether 4 but it does not eliminate it. This is important to allow the tension sensor 52 to continue to sense a change in tension so that the controller 100 can change the motor's direction and speed as described above. This allows the tether management system 2 to perform its function of keeping the tether 4 within an acceptable tension range responsively.

Although the present invention is described as implemented in the above described embodiment, it is not to be construed to be limited as such. For example, although the tether management system 2 is described for use with a UAV 6, those skilled in the art will recognize that such a system 2 can be used in other applications including, but not limited to, tethering of other robots, e.g. an underwater robot, and also in applications for managing a cable between two moving vehicles.

Figure 5:
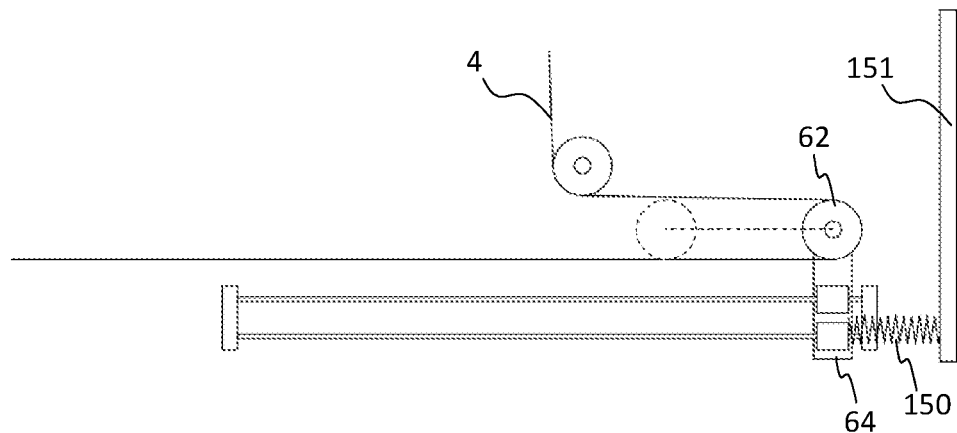
FIG. 5 is a schematic drawing of a tether management system according to another embodiment of the invention.

As another example, the compensator system 2 may include two compression springs instead of only one 80 as described above. A second compression spring (not shown) may be sleeved over the second rod 70 for example. In such an embodiment, the limit stop 82 will accordingly have to be moved to another location. As yet another example, instead of a compression spring 80, a torsion spring 150 such as that shown in FIG. 5 may be used instead. One end of the torsion spring 150 is attached to a side wall 151 and the other end is attached to the pulley block 64.

Figure 6:
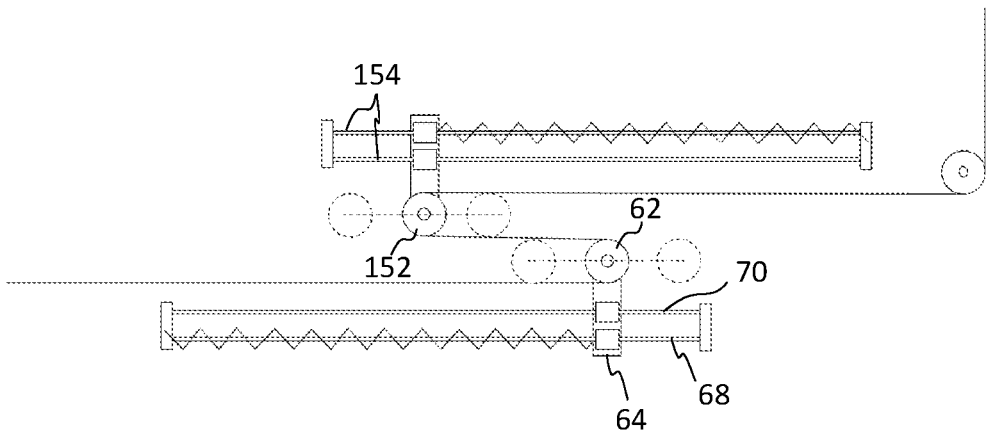
FIG. 6 is a schematic drawing of a tether management system according to yet another embodiment of the invention.

As yet a further example, the compensator system 60 may include a second moveable pulley 152 that is moveable along a second pair of moveable rods 154 disposed side by side with the moveable pulley 62 and its corresponding rods 68, 70 as shown in FIG. 6. Such a design having two or more moveable pulleys in series can provide a larger buffer, and the reel in and reel out speed may also be doubled.

As another example, the double rod 68, 70 in the above described embodiment may be replaced with a linear track on which the pulley block 64 is slidable. Alternatively, a single rod may be used. In such a case, the pulley block 64 may be provided with rollers that rest against the sidewall to prevent the pulley block 64 from rotating about the single rod.

As yet another example, the compression spring 80 sleeved on the rod design described above may be replaced with a compression spring in a tubular structure. This tubular structure has a groove running along its length that allows the pulley block 64 to be coupled to an end of the compression spring and to be slidable thereon.

As yet a further example, especially when space permits, the fixed pulleys 84, 86 may be omitted. The spool 8, moveable pulley 62 and the tension assembly 40 may be appropriately spaced apart from one another to avoid interference with one another or with the walls of the housing 28.

It should be further appreciated by the person skilled in the art that one or more of the above modifications or improvements, not being mutually exclusive, may be further combined to form yet further embodiments of the present invention.

The invention claimed is:

1. A tether management system comprising:
   a spool rotatable to reel in and reel out a tether;
   a tension pulley engaging the tether;
   a tension sensor coupled to the tension pulley for measuring a tension of the tether;
   a controller for receiving a desired tension of the tether and for controlling the rotation of the spool to reel in and reel out the tether based on a difference between a measured tension from the tension sensor and the desired tension of the tether;
   a moveable pulley that does not directly actuate the tension sensor and is disposed to engage tether between the spool and the tension pulley;
   an elongated compression spring for biasing the moveable pulley to be moveable along a linear path to adjust a tension of the tether when the tension of the tether deviates from the desired tension;
   a first rod over which the elongated compression spring is sleeved;
   a second rod at least substantially parallel to the first rod;
   a pulley support for supporting the moveable pulley, the pulley support including two bushings through which the first rod and the second rod penetrate to allow the pulley support to be slidable thereon;
   a first end block at a first end of the first rod and the second rod; and
   a second end block at a second end of the first rod and the second rod;
   wherein the elongated compression spring has a free length that is at least substantially equal to a length of the first rod, and, when biased, has a force of about twice the tension of the tether over a range of operating tension of the tether.

2. The tether management system according to claim 1, further comprising a limit stop disposed adjacent an intermediate position between the first end block and the second end block to limit movement of the pulley support to be along the first rod and the second rod between the second end block and the limit stop.

3. The tether management system according to claim 1, wherein the thickness of the spool is in the range of 1-10 times the thickness of the tether.

4. The tether management system according to claim 1, further comprising a housing having a base, a roof opposite the base and a sidewall between the base and the roof, and wherein the spool is disposed such that a radial plane thereof is at least substantially parallel to the base of the housing.

5. The tether management system according to claim 4, further comprising:
   a fixed pulley disposed to engage tether between the moveable pulley and the tension pulley;
   wherein the tension pulley guides the tether along an exit section of a path of the tether extending through the roof of the housing.

6. The tether management system according to claim 5, wherein the exit section is transverse to the linear path of the moveable pulley.

7. The tether management system according to claim 5, further comprising:
   a bracket to which the tension pulley and the tension sensor are mounted; and
   a fairlead mounted to the bracket through which the tether exits the housing, the fairlead including at least one roller that is able to urge the tether against the tension pulley.

8. The tether management system according to claim 1, wherein the controller is adapted to determine a speed for rotating the spool based on a difference between the measured tension of the tether and the desired tension.

9. The tether management system according to claim 8, wherein the controller is adapted to further limit the speed for rotating the spool to a cap value corresponding to a length of tether left on the spool when less than a predetermined length of tether is left on the spool.

10. The tether management system according to claim 9, further comprising a sensor for determining if an end of spool is near, and wherein the controller is adapted to set the speed to zero when the sensor indicates so.

11. The tether management system according to claim 1, further comprising a guard disposed adjacent the spool to prevent tether slippage.

* * * * *